United States Patent
Kowalkowski et al.

(10) Patent No.: US 9,501,452 B2
(45) Date of Patent: Nov. 22, 2016

(54) EXPONENTIALLY WEIGHTED MOVING AVERAGING FILTER WITH ADJUSTABLE WEIGHTING FACTOR

(71) Applicant: GM Global Technology Operations LLC, Detroit, MI (US)

(72) Inventors: Janean E. Kowalkowski, Northville, MI (US); Igor Anilovich, Walled Lake, MI (US); Jason J. Chung, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 563 days.

(21) Appl. No.: 14/055,092

(22) Filed: Oct. 16, 2013

(65) Prior Publication Data

US 2014/0122020 A1   May 1, 2014

Related U.S. Application Data

(60) Provisional application No. 61/718,409, filed on Oct. 25, 2012.

(51) Int. Cl.
*G06F 17/18* (2006.01)
*F01N 11/00* (2006.01)
(Continued)

(52) U.S. Cl.
CPC ............... *G06F 17/18* (2013.01); *F01N 11/00* (2013.01); *F02D 41/222* (2013.01); *F01N 2560/026* (2013.01); *F02D 41/146* (2013.01); *F02D 2041/1432* (2013.01); *Y02T 10/40* (2013.01); *Y02T 10/47* (2013.01)

(58) Field of Classification Search
CPC ............. F01N 11/00; F01N 2560/026; F02D 2041/1432; F02D 41/146; F02D 41/222; G06F 17/18; Y02T 10/40; Y02T 10/47

USPC .................... 702/179, 190; 60/274; 340/633; 370/252

See application file for complete search history.

(56) References Cited

U.S. PATENT DOCUMENTS 4,796,213 A   1/1989   Blotenberg
5,431,011 A   7/1995   Casarella et al.
(Continued)

FOREIGN PATENT DOCUMENTS

CN   101609342 A   12/2009
DE   10049685 A1   4/2002

OTHER PUBLICATIONS

German Office Action for DE Application No. 10 2013 221 530.4, dated Dec. 12, 2014, pp. 1-8.
(Continued)

*Primary Examiner* — John H Le
(74) *Attorney, Agent, or Firm* — Cantor Colburn LLP

(57) ABSTRACT

A method of increasing a weighting factor of an exponentially weighted moving averaging ("EWMA") filter is provided. The method includes monitoring a data stream containing raw data values, and determining an EWMA value based on the data stream by an electronic control module. The method includes determining if the EWMA value is between a predetermined maximum fault threshold value and a predetermined minimum fault threshold value. The method includes increasing the weighting factor of the EWMA filter to more heavily weigh incoming raw data values of the data stream based on the difference between the first raw data value and a previously calculated filtered value exceeding the calibration value.

17 Claims, 3 Drawing Sheets

(51) Int. Cl.
*F02D 41/22* (2006.01)
*F02D 41/14* (2006.01)

(56) References Cited

U.S. PATENT DOCUMENTS 5,630,315 A * 5/1997 Theis ................... F01N 11/002
                                                            60/274
7,222,056 B2    5/2007  Wiechers
8,629,781 B2    1/2014  Kowalkowski et al.
2010/0188986 A1 7/2010  Csaszar et al.

OTHER PUBLICATIONS

Office Action issued on Apr. 26, 2016 in corresponding CN Patent Application No. 201310757021.3.

* cited by examiner

EXPONENTIALLY WEIGHTED MOVING AVERAGING FILTER WITH ADJUSTABLE WEIGHTING FACTOR

CROSS REFERENCE TO RELATED APPLICATIONS

This patent application claims priority to U.S. Provisional Patent Application Ser. No. 61/718,409 filed on Oct. 25, 2012 which is hereby incorporated herein by reference in its entirety.

FIELD OF THE INVENTION

Exemplary embodiments of the invention relate to a system and method of increasing a weighting factor of an Exponentially Weighted Moving Averaging ("EWMA") filter and, more particularly, to a system and method of increasing a weighting factor to more heavily weigh incoming raw data values of a data stream.

BACKGROUND

Exponentially Weighted Moving Averaging ("EWMA") filtering is a data processing technique used to reduce the variability of an incoming stream of data that is monitored over a period of time. A EWMA filter calculates an averaged or filtered value that is based on raw data points collected from the incoming stream of data. In one approach, EWMA filtering may be used to filter data collected by a nitrogen oxide sensor ("NOx") sensor. The NOx sensor may be located within an exhaust gas conduit of an exhaust gas treatment system, and is used to generate a signal that is indicative of the level of NOx in exhaust gas emitted from an internal combustion engine. The EWMA filter monitors the data collected by the NOx sensor to determine a filtered value.

In the event the filtered value determined by the EWMA filter exceeds a maximum threshold value or is below a minimum threshold value during a diagnostic test, a diagnostic trouble code ("DTC") may be set to a fail status. The fail status indicates that there may be an issue with the NOx sensor (e.g., an element in the sensor is cracked, or contaminated), and a malfunction indicator light ("MIL") may be illuminated to indicate the fault. Corrective action may be taken to repair or replace the NOx sensor. However, if the fail status stored in the vehicle computer is not manually cleared after the corrective action, the MIL light will eventually be turned off or deactivated after the filtered value determined by the EWMA filter is below the fault threshold value, and the diagnostic test is passed a predetermined number of times. Specifically, some types of regulations require that the diagnostic test passes for three key or ignition cycles before the MIL is allowed to deactivate at the beginning of the fourth key cycle.

EWMA filtering may delay deactivating the MIL. This is because EWMA filtering tends to place significant emphasis on relatively older data collected from the NOx sensor that indicates the fail status. Thus, the filtered value calculated by the EWMA filter may exceed the threshold value even after the NOx sensor has been repaired or replaced. Accordingly, it is desirable to provide an approach for EWMA filtering that provides a filtered value with increased accuracy.

SUMMARY OF THE INVENTION

In one exemplary embodiment of the invention, a method of increasing a weighting factor of an exponentially weighted moving averaging ("EWMA") filter is provided. The method includes monitoring a data stream containing raw data values, and determining an EWMA value based on the data stream by an electronic control module. The method includes determining if the EWMA value is between a predetermined maximum fault threshold value and a predetermined minimum fault threshold value. The method includes increasing the weighting factor of the EWMA filter to more heavily weigh incoming raw data values of the data stream based on the difference between the first raw data value and a previously calculated filtered value exceeding the calibration value. In one embodiment, the weighting factor is determined empirically.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
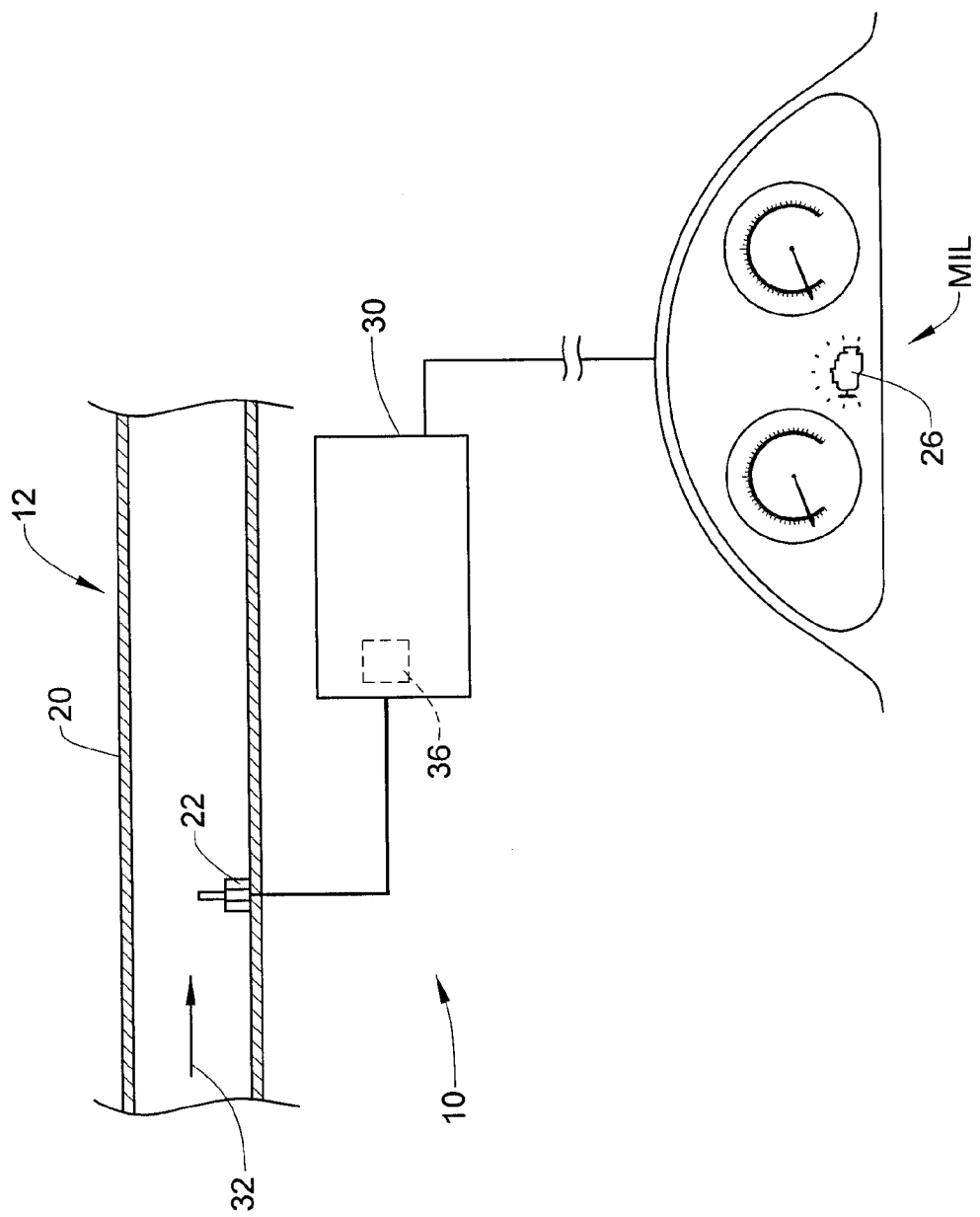
FIG. 1 is an exemplary schematic diagram of a diagnostic system including a sensor and a control module.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, or a combinational logic circuit.

Referring now to FIG. 1, an exemplary embodiment is directed to a diagnostic system 10 for an exhaust gas treatment system 12 including an exhaust gas conduit 20, a nitrogen oxide ("NOx") sensor 22, a malfunction indicator lamp ("MIL") 26 and a control module 30. The control module 30 is in communication with the NOx sensor 22 and the MIL 26. The NOx sensor 20 monitors an exhaust gas 32 produced by an internal combustion engine (not shown), and generates a signal indicative of a level of NOx in the exhaust gas 32. The control module 30 monitors the NOx sensor 22 to determine the level of NOx in the exhaust gas 32. The control module 30 uses an exponentially weighted moving averaging ("EWMA") filter 36 to reduce the variability of a stream of data that is collected over a period of time by the NOx sensor 22.

It should be noted that while FIG. 1 illustrates the control module 30 monitoring a NOx sensor 22, the diagnostic system 10 may be applied to any type of diagnostic system that uses EWMA filtering to reduce the variability of raw data that is collected over a period of time. For example, the diagnostic system 10 may be used to filter catalyst test data from a device such as, for example, a selective catalytic reduction ("SCR") device. Some other examples of the diagnostic system 10 may include an air quality system.

In one embodiment, the NOx sensor 22 generates a pumping current ratio signal to indicate whether the NOx sensor 22 is functioning as intended. The pumping current ratio is based on the amount of current needed to pump 1000 ppm of oxygen ("$O_2$") into a chamber (not shown) of the NOx sensor 22, and indicates if the NOx sensor 22 has faulted. For example, if the pumping current ratio is relatively high, this may indicate contamination of the NOx sensor 22, and if the pumping current ratio is relatively low, this may indicate a cracked NOx sensor 22. The EWMA filter 36 receives, as input, the pumping current ratio signal from the NOx sensor 22. The pumping current ratio signal is a raw data value collected by the NOx sensor 22 over a period of time. The EWMA filter 36 determines averaged or filtered pumping current ratio values based on the raw data.

Figure 2:
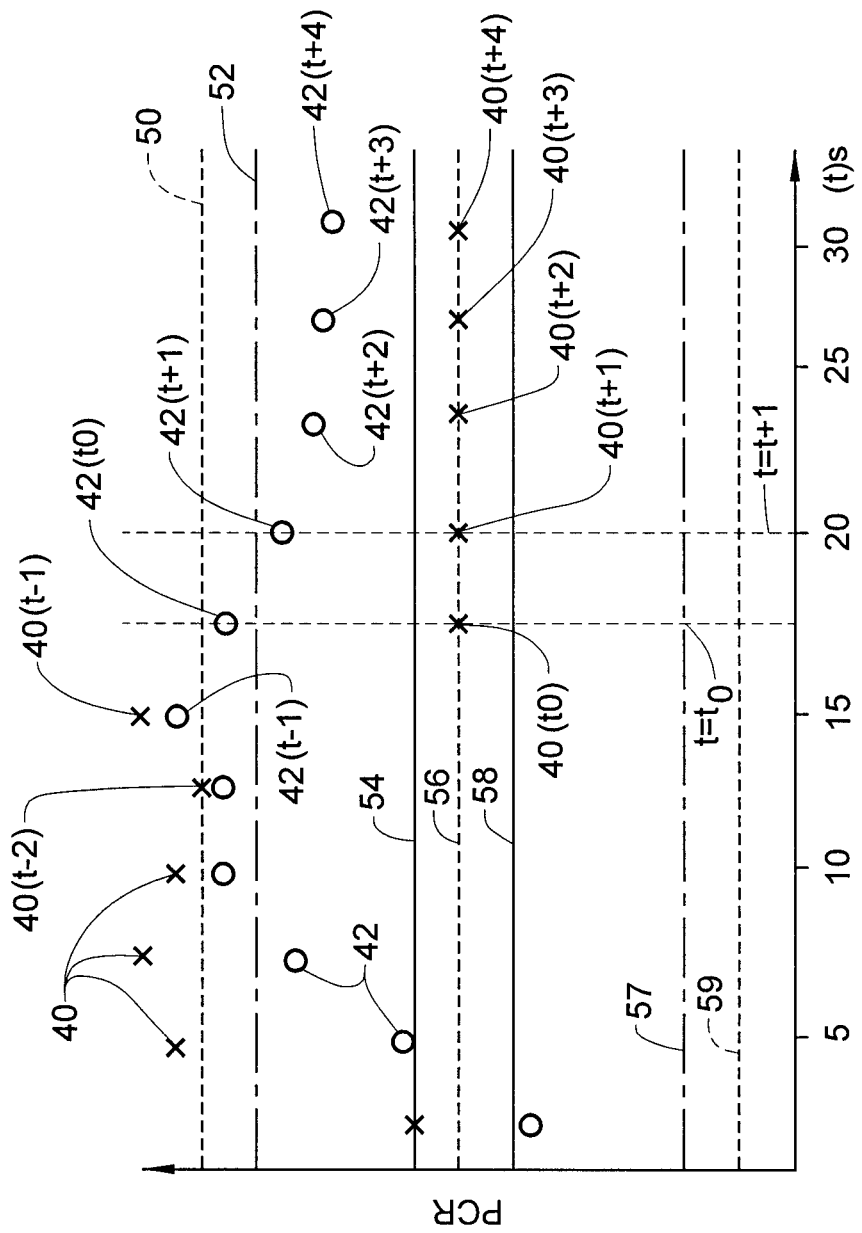
FIG. 2 is a graph illustrating raw values collected by the sensor in FIG. 1 and averaged or filtered values calculated by an EWMA filter.

FIG. 2 is an exemplary graph illustrating a stream of raw values 40 (e.g., the pumping current ratio (PCR) signal) collected over a period of time t by the NOx sensor 22 (FIG. 1). Each raw value 40 represents the results of a diagnostic test (e.g., each raw value 40 represents the results of one diagnostic test, and the graph in FIG. 2 is an illustration of twelve different diagnostic tests). In one embodiment, the control module 30 (FIG. 1) performs a self-diagnostic test by determining if the pumping current ratio signal generated by the NOx sensor 22 indicates a fault within the NOx sensor 22. The EWMA filter 36 (FIG. 1) determines averaged or filtered values 42 based on the raw values 40. The graph also illustrates a maximum fault threshold value 50, a maximum re-pass threshold 52, a worst performing acceptable ("WPA") maximum level 54, a WPA nominal level 56, a WPA minimum level 58, a minimum re-pass value 57, and a minimum fault threshold value 59.

Referring now to both FIGS. 1-2, the maximum fault threshold value 50 represents the minimum pumping current ratio value required to trigger a fault in the control module 30 indicating a fault due to an elevated pumping current ratio such as, for example, contamination of the NOx sensor 22. Specifically, in the event a specific filtered value 42, determined by the EWMA filter 36, exceeds the level indicated by the maximum fault threshold value 50 during a diagnostic test, a diagnostic trouble code ("DTC") may be set to a fail status by the control module 30. The failed status indicates that a fault within the NOx sensor 22 may have occurred, and therefore the MIL 26 may be illuminated by the control module 30. The maximum re-pass value 52 represents the filtered value 42 that the EWMA filter 36 is required to generate before the control module 30 may reset the DTC to a pass status after the filtered value 42 has exceeded the maximum fault threshold value 50 and the fail status has been set.

The WPA maximum level 54, the WPA nominal level 56, and the WPA minimum level 58 represent a range of acceptable raw values 40 that may be used by control module 30 during a diagnostic test to determine a pass status result during a diagnostic test. Specifically, any raw value 40 that exceeds the WPA maximum level 54 or that is less than the WPA minimum level 58 may not be used by the control module 30 to determine if the pumping current ratio indicates a fault in the NOx sensor 22 (FIG. 1). The minimum fault threshold value 59 represents the minimum pumping current ratio value required to trigger a fault in the control module 30 indicating the pumping current ratio has fallen to a relatively low level, and may indicate the NOx sensor 22 is cracked. In the event a specific filtered value 42 determined by the EWMA filter 36 is less than the level indicated by the minimum fault threshold value 59 during a diagnostic test, a DTC may be set to a fail status by the control module 30. The minimum re-pass value 57 represents the filtered value 42 that the EWMA filter 36 is required to generate before the control module 30 may reset the DTC to a pass status after the filtered value 42 has dropped below the minimum fault threshold value 59 and the fail status has been set.

Figure 3:
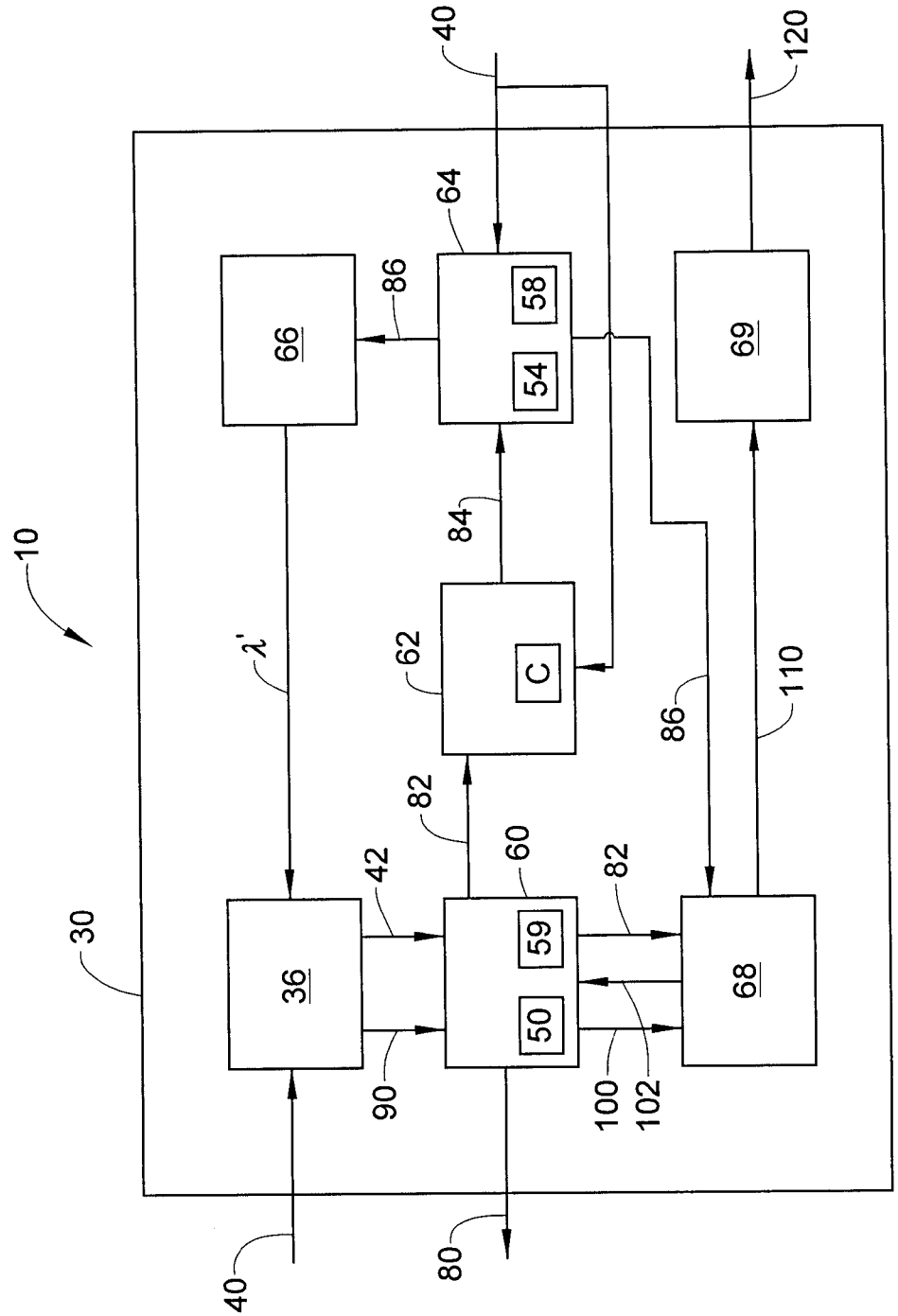
FIG. 3 is a dataflow diagram of the control module shown in FIG. 1.

Referring now to FIG. 3, a dataflow diagram illustrates various embodiments of the diagnostic system 10 that may be embedded within the control module 30. Various embodiments of the diagnostic system 10, according to the present disclosure, may include any number of sub-modules embedded within the control module 30. As can be appreciated, the sub-modules, shown in FIG. 3, may be combined and/or further partitioned to monitor the NOx sensor 22 (FIG. 1). Inputs to the control module 30 may be received from the NOx sensor 22 (FIG. 1), received from other control modules (not shown), and/or determined/modeled by other sub-modules (not shown) within the control module 30. In various embodiments, the control module 30 includes the EWMA filter 36, a diagnostic module 60, a raw value difference module 62, a WPA module 64, a EWMA weighting factor module 66, a testing module 68, and a diagnostic reporting module 69.

The EWMA filter 36 receives, as input, a raw value 40 that represents the pumping current ratio signal that is currently being detected or observed by the NOx sensor 22 (FIG. 1). In the approach as discussed, the raw value 40 represents the pumping current ratio signal detected by the NOx sensor 22 (FIG. 1) at an observation time of $t=t_0$ (FIG. 2). The raw value 40 currently detected is illustrated in FIG. 2 as raw value $40_{(t0)}$. The EWMA filter 36 determines a filtered value 42, which is illustrated in FIG. 2 as the filtered value $42_{(t0)}$. The current filtered value 42 is based on the raw value 40 detected at the observation time of $t=t_0$, as well as filtered values 42 that have been previously calculated by the EWMA filter 36. Specifically, the filtered value 42 may be determined by Equation 1:

$$\text{EWMA}(t_0)=\lambda Y_{t0}+(1-\lambda)(\text{EWMA})_{t-1} \ldots (1-\lambda)(\text{EWMA})_{t-n} \qquad \text{(Equation 1)}$$

for t=1, 2, ... n
where EWMA is the filtered value 42 being calculated at the observation time of $t=t_0$, $\lambda$ is a current weighting factor, $Y_{t0}$ is the raw value 40 that is being inputted into the EWMA filter 36 at the current observation of time $t=t_0$, $(\text{EWMA})_{t-1}$ is a previously calculated filtered value 42 at the last observation time of $t=t-1$, and n is the number of observations.

The diagnostic module 60 receives, as inputs, the current filtered value 42 (or an adjusted filtered value 90, which is discussed below) from the EWMA filter 36. The diagnostic module 60 performs a diagnostic test by comparing the current filtered value 42 to the maximum fault threshold value 50 and the minimum fault threshold value 59. In the event filtered value 42 is greater than the fault threshold value 50 or less than the minimum fault threshold value 59, this is an indication that the diagnostic test has not passed, and a fault threshold signal 82 is generated by the diagnostic module 60 indicating a fail status.

The diagnostic module 60 may also generate a signal 80 that sets the DTC status to fail once the diagnostic test has not passed. For example, referring to FIGS. 2-3, the signal 80 would be set by the diagnostic module 60 at the observation time of t=t−1, as the filtered value 42 generated by the EWMA filter 36 has exceeded the maximum fault threshold value 50.

The raw value difference module 62 receives, as inputs, the raw value 40 from the NOx sensor 22 (FIG. 1) and the fault threshold signal 82 from the diagnostic module 60. If the fault threshold signal 82 is received, the raw value difference module 62 compares a difference between the raw value 40 currently detected (e.g., at the current observation time of t=$t_0$) and a previously determined previously calculated filtered value 42 measured at the last observation of t=1 that is saved in memory. The raw value difference module 62 determines if the difference between the raw value 40 (at the current observation time of t=$t_0$) and the previously determined previously calculated filtered value 42 (at the last observation time of t=t−1) are greater than a calibration value C. This may be expressed by Equation 2:

$$(EWMA)_{t-1} - \text{raw value}_{(t0)} > C \qquad \text{(Equation 2)}$$

where $(EWMA)_{t-1}$ is the previously calculated filtered value 42 at the last observation time of t=t−1 ($42_{(t-1)}$) and the raw value$_{(t0)}$ is the raw value 40 measured at the current observation time of t=$t_0$ ($40_{(t0)}$) shown in FIG. 2).

The calibration value C is a predetermined value, which generally indicates the pumping current ratio indicated by the filtered value 42 at t=$t_0$, is not within a passing range and may either exceed the maximum threshold value 50 or may be below the minimum threshold value 59. In the event the difference between the previously calculated filtered value $(EWMA)_{t-1}$ and the raw value$_{(t0)}$ is greater than the calibration value C, the raw value difference module 62 generates a calibration signal 84.

The WPA module 64 receives, as input, the raw value 40 and the calibration signal 84. In the event the WPA module 64 receives the calibration signal 84 from the raw value difference module 62, the WPA module 64 compares the raw value 40 with the WPA maximum level 54 and the WPA minimum level 58. If the raw value 40 is less than the WPA maximum level 54 and greater than the WPA minimum level 58, then the WPA module 64 generates a rapid healing logic signal 86. The rapid healing logic signal 86 indicates that a potential corrective action may have occurred, and the NOx sensor 22 (FIG. 1) may have been repaired or replaced.

The EWMA weighting factor module 66 receives, as input, the rapid healing logic signal 86 from the WPA module 64. Upon receipt of the rapid healing logic signal 86, the EWMA weighting factor module 66 sends an adjusted weighting factor $\lambda'$ to the EWMA filter 36. The value of the adjusted weighting factor $\lambda'$ is greater than the value of the current weighting factor $\lambda$ used in Equation 1 above. Referring now to FIGS. 2-3, the adjusted weighting factor $\lambda'$ will more heavily weight the incoming raw values 40 starting from $40_{(t0)}$ (e.g., $40_{(t0)}$, $40_{(t+1)}$, $40_{(t+2)}$, $40_{(t+3)}$, and $40_{(t+4)}$ shown in FIG. 2) during calculation of the corresponding filtered values 42 starting at time t0 (e.g., $42_{(t0)}$, $42_{(t+1)}$, $42_{(t+2)}$, and $42_{(t+3)}$ shown in FIG. 2) when compared to the current weighting factor $\lambda$. Therefore, when the EWMA filter 36 calculates a next filtered value $42_{(t0)}$ when rapid healing logic is active, at observation time of t=t0, the filtered value $42_{(t0)}$ generally may produce a value that is below the maximum failure threshold 50, but still above re-pass value 52. This value would still represent a failing result. However, the next filtered value $42_{(t+1)}$ would indicate a passed result. The new weighting factor $\lambda'$ may be determined empirically, and may be adjusted based on the specific application.

The EWMA filter 36 determines the adjusted filtered value 90 based on the raw value 40 that is detected at an observation time of t=t0 (shown in FIG. 2) using the new weighting factor $\lambda'$. Specifically, the adjusted filtered value 90 may be determined by the following equation:

$$EWMA(t0) = \lambda' Y_{t0} + (1-\lambda')(EWMA)_{t-1} \ldots (1-\lambda') (EWMA)_{t-n} \qquad \text{(Equation 3)}$$

where EWMA(t0) is the filtered value 90 being calculated at the observation time of t=t0, $\lambda'$ is the new weighting factor, $Y_{t0}$ is the raw value 40 that is being inputted into the EWMA filter 36 at the observation of time t=t0, $(EWMA)_{t-1}$ is a previously calculated filtered value 42 at the last observation time of t=t−1, and n is the number of observations.

The diagnostic module 60 receives, as input, the adjusted filtered value 90 from the EWMA filter 36. The diagnostic module 60 performs a diagnostic test by comparing the adjusted filtered value 90 to the maximum fault threshold value 50 and the minimum fault threshold value 59. The diagnostic module 60 determines if the adjusted filtered value 90 is less than the maximum fault threshold value 50 and greater than the minimum fault threshold value 59. If the filtered value 42 is less than the maximum fault threshold value 50, this is an indication the diagnostic test has passed, and the diagnostic module 60 generates a passing signal 100 that is sent to the testing module 68. The passing signal 100 indicates that a diagnostic test performed by the diagnostic module 60 has generated a pass status.

The testing module 68 receives, as input, the fault threshold signal 82 and the passing signal 100 generated by the diagnostic module 60, as well as the rapid healing logic signal 86 from the WPA module 64. Upon receipt of the rapid healing logic signal 86, the testing module 68 will send an initiate testing signal 102 back to the diagnostic module 60. The initiate testing signal 102 will cause the diagnostic module 60 to perform an increased number of diagnostic tests over a period of time. As a result, the fault threshold signal 82 or passing signal 100 will be sent from the diagnostic module 60 to the testing module 68 more frequently.

The testing module 68 will continue to monitor the diagnostic module 60 to determine if a predetermined number of diagnostic tests have completed and indicate a pass status (e.g., indicated by the passing signal 100) over a predetermined number of ignition cycles. If the testing module 68 determines that the predetermined number of diagnostic tests have passed over a predetermined number of drive cycles, then a reset signal 110 is sent to the diagnostic reporting module 69. In one embodiment, the testing module 68 may delay sending the reset signal 110 to the diagnostic reporting module 69 until the predetermined number of diagnostic tests have been performed over the predetermined number of drive cycles. For example, in one embodiment, the testing module 68 monitors the diagnostic module 60 for a predetermined number of diagnostic tests over three ignition cycles. If the diagnostic tests all generate passing results, at the beginning of the fourth ignition cycle, the reset signal 110 is sent to the diagnostic reporting module 69, and the MIL 26 (FIG. 1) is deactivated.

The diagnostic reporting module 69 receives, as input, the reset signal 110 from the testing module 68, and generates a signal 120 updating the DTC status to pass, and the MIL 26 (FIG. 1) is deactivated (e.g., the light is shut off).

Referring generally to FIGS. 1-3, the diagnostic system 10 replaces the current weighting factor $\lambda$ with the adjusted weighting factor $\lambda'$ if the control module 30 determines a corrective action to the NOx sensor 22 has been performed after the NOx sensor 22 indicates a fault. The adjusted weighting factor λ' will more heavily weight the incoming raw values 40 generated by the NOx sensor 22 when compared to the current weighting factor λ. Therefore, the EWMA filter 36 is able to account for a relatively sudden change in raw data that is collected from the NOx sensor 22 due to a corrective action being performed. As a result, the EWMA filter 36 is generally able to generate filtered values 42 that pass a diagnostic test immediately after the NOx sensor 22 generates passing values (e.g., shown in FIG. 2 as the filtered value $42_{(t+1)}$ at the observation time of t=t+1). Thus, the DTC status may be updated to the pass status and MIL 26 may be deactivated in less time (e.g., fewer ignition cycles) when compared to some diagnostic systems that are currently available.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of increasing a weighting factor of an exponentially weighted moving averaging ("EWMA") filter, comprising:
    monitoring a data stream containing raw data values and determining an EWMA value based on the data stream by an electronic control module including operative logic;
    determining if the EWMA value is between a predetermined maximum fault threshold value and a predetermined minimum fault threshold value;
    increasing the weighting factor of the EWMA filter to an adjusted weighting factor to more heavily weigh incoming raw data values of the data steam based on the difference between the first raw data value and a previously calculated filtered data value exceeding the calibration value;
    comparing the raw data values to the WPA maximum level and the WPA minimum level; and
    generating a rapid healing logic signal if the raw values are greater than the WPA minimum level and less than the WPA maximum level, the rapid healing logic signal indicating existence of a potential corrective action.

2. The method of claim 1, wherein the EWMA filter determines an adjusted filter value based on the formula $EWMA(t0)=\lambda'Y_{t0}+(1-\lambda')(EWMA)_{t-1} \ldots (1-\lambda')(EWMA)_{t-n}$.

3. The method of claim 1, further comprising: passing the adjusted filter value to a diagnostic module.

4. The method of claim 3, further comprising: comparing the maximum fault threshold value and the minimum fault threshold value to the adjusted filter value.

5. The method of claim 3, further comprising: issuing a passing signal if the adjusted filter value is less than the minimum fault threshold value.

6. The method according to claim 1, further comprising: providing a worst performing acceptable (WPA) maximum level, and a WPA minimum level for the EWMA filter to a WPA module.

7. A diagnostic system comprising:
    a sensor;
    an exponentially weighted moving averaging ("EWMA") filter operatively connected to the sensor; and
    a control module operatively connected to the EWMA filter, the control module being configured and disposed to increase the weighting factor of the EWMA filter to an adjusted weighting factor to more heavily weigh incoming raw data values of the data stream, wherein the WPA module is configured and disposed to generate a rapid healing logic signal if raw data values passing to the EWMA filter are greater than the WPA minimum level and less than the WPA maximum level, the rapid healing logic signal indicating the existence of a potential corrective action of the sensor.

8. The diagnostic system according to claim 7, wherein the EWMA filter is configured and disposed to establish an adjusted filtered value based on the formula $EWMA(t0)=\lambda'Y_{t0}+(1-\lambda')(EWMA)_{t-1} \ldots (1-\lambda')(EWMA)_{t-n}$.

9. The diagnostic system according to claim 7, further comprising: a diagnostic module operatively connected to the control module, the diagnostic module being configured and disposed to determine if the adjusted filtered value is between a predetermined maximum fault threshold value and a predetermined minimum fault threshold value.

10. The diagnostic system according to claim 9, wherein the diagnostic module is configured and disposed to compare the adjusted filtered value to a maximum fault threshold value and a minimum fault threshold value.

11. The diagnostic system according to claim 7, further comprising: a worst performing acceptable (WPA) module operatively connected to the control module, the WPA module including a WPA maximum level, and a WPA minimum level for the EWMA filter.

12. The diagnostic system according to claim 7, wherein the sensor comprises a NOx sensor.

13. An exhaust gas treatment system comprising:
    an exhaust gas conduit;
    a sensor operatively connected to the exhaust gas conduit;
    an exponentially weighted moving averaging ("EWMA") filter operatively connected to the sensor; and
    a control module operatively connected to the EWMA filter, the control module being configured and disposed to increase the weighting factor of the EWMA filter to an adjusted weighting factor to more heavily weigh incoming raw data values of the data stream, wherein the WPA module is configured and disposed to generate a rapid healing logic signal if raw data values passing to the EWMA filter are greater than the WPA minimum level and less than the WPA maximum level, the rapid healing logic signal indicating the existence of a potential corrective action of the sensor.

14. The exhaust gas treatment system according to claim 13, wherein the EWMA filter is configured and disposed to establish an adjusted filtered value based on the formula $EWMA(t0)=\lambda'Y_{t0}+(1-\lambda')(EWMA)_{t-1} \ldots (1-\lambda')(EWMA)_{t-n}$.

15. The exhaust gas treatment system according to claim 14, further comprising: a diagnostic module operatively connected to the control module, the diagnostic module being configured and disposed to determine if the adjusted filtered value is between a predetermined maximum fault threshold value and a predetermined minimum fault threshold value.

16. The exhaust gas treatment system according to claim 15, wherein the diagnostic module is configured and disposed to compare the adjusted filtered value to a maximum fault threshold value and a minimum fault threshold value.

17. The exhaust gas treatment system according to claim 13, further comprising: a worst performing acceptable (WPA) module operatively connected to the control module, the WPA module including a WPA maximum level, and a WPA minimum level for the EWMA filter.

* * * * *